(12) United States Patent
Lee (10) Patent No.: US 11,195,094 B2
(45) Date of Patent: Dec. 7, 2021

(54) NEURAL NETWORK CONNECTION REDUCTION

(71) Applicant: FUJITSU LIMITED, Kawasaki (JP)

(72) Inventor: Michael Lee, Saratoga, CA (US)

(73) Assignee: FUJITSU LIMITED, Kawasaki (JP)

( * ) Notice: Subject to any disclaimer, the term of this patent is extended or adjusted under 35 U.S.C. 154(b) by 728 days.

(21) Appl. No.: 15/408,407

(22) Filed: Jan. 17, 2017

(65) Prior Publication Data

US 2018/0204115 A1 Jul. 19, 2018

(51) Int. Cl.
*G06N 3/08* (2006.01)
*G06N 3/04* (2006.01)

(52) U.S. Cl.
CPC .......... *G06N 3/082* (2013.01); *G06N 3/0454* (2013.01)

(58) Field of Classification Search
CPC ........ G06N 3/0454; G06N 3/063; G06N 3/08; G06N 3/082; Y04S 10/54
See application file for complete search history.

(56) References Cited

U.S. PATENT DOCUMENTS

| | | | | |
|---|---|---|---|---|
| 5,596,681 A * | 1/1997 | Tamura | ................... | G06N 3/082 706/25 |
| 6,049,793 A * | 4/2000 | Tomita | ................. | G06K 9/6253 706/17 |
| 2016/0217369 A1 * | 7/2016 | Annapureddy | ........ | G06N 3/082 |
| 2016/0358070 A1 * | 12/2016 | Brothers | .............. | G06N 3/0454 |
| 2018/0114110 A1 * | 4/2018 | Han | ......................... | G06N 3/04 |
| 2019/0279089 A1 * | 9/2019 | Wang | ................... | G06N 3/0481 |

FOREIGN PATENT DOCUMENTS

| | | | | |
|---|---|---|---|---|
| JP | H07-146852 A | | 6/1995 | |
| WO | WO-2018090706 A1 * | | 5/2018 | ............. G06N 3/082 |

OTHER PUBLICATIONS

Lane et al., "DeepX:A Software Accelerator for Low-Power Deep Learning Inference on Mobile Devices", 2016 (Year: 2016).*
Parallel Layer Perceptron, Caminhas et al. (2003).
ImageNet Classification with Deep Convolutional neural Networks, Krizhevsky et al. (2012).
Reducing the Training Time of Neural Networks by Partitioning, Miranda & Zuben (2016).
JP Office Action dated Jul. 20, 2021 as received in application No. 2017-227542.

* cited by examiner

*Primary Examiner* — Li B. Zhen
*Assistant Examiner* — Selene A. Haedi
(74) *Attorney, Agent, or Firm* — Maschoff Brennan (57) ABSTRACT

A method of updating a neural network may be provided. A method may include selecting a number of neurons for a layer for a neural network such that the number of neurons in the layer is less than at least one of a number of neurons in a first layer of the neural network and a number of neurons in a second, adjacent layer of the neural network. The method may further include and at least one of inserting the layer between the first layer and the second layer of the neural network and replacing one of the first layer and the second layer with the layer to reduce a number of connections in the neural network.

9 Claims, 9 Drawing Sheets

NEURAL NETWORK CONNECTION REDUCTION

FIELD

The embodiments discussed herein relate to neural networks and, more specifically, to reducing a number of connections in a neural network.

BACKGROUND

Neural network analysis may include models of analysis inspired by biological neural networks attempting to model high-level abstractions through multiple processing layers. However, neural network analysis may consume large amounts of computing and/or network resources.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include a method of updating a neural network. The method may include selecting a number of neurons for a layer for a neural network such that the number of neurons in the layer is less than at least one of a number of neurons in a first layer of the neural network and a number of neurons in a second, adjacent layer of the neural network. The method may further include at least one of inserting the layer between the first layer and the second layer of the neural network and replacing one of the first layer and the second layer with the layer to reduce a number of connections in the neural network.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DESCRIPTION OF EMBODIMENTS

Various embodiments disclosed herein relate to inserting a layer between two layers in a neural network and/or replacing a layer within a neural network with a replacement layer. In various embodiments, a number of neurons in the insertion layer and/or a number of neurons in the replacement layer may be selected such that the number of connections in the neural network is reduced upon insertion of the insertion layer and/or the replacement layer. Accordingly, various embodiments disclosed herein may reduce memory requirements and/or improve efficiency of a neural network, while maintaining an acceptable level of performance (e.g., degree of accuracy) of the neural network.

Artificial neural networks utilize a network of neurons, which are commonly deployed in a stack of layers, to perform complex cognitive tasks such as computer vision and speech recognition, which are very difficult to solve using the ordinary rule-based programming.

Neurons of a neural network may communicate with each other through synaptic connections between them, and each connection may have a numeric weight for tuning the importance of communication between the neurons. The weight tuning and therefore the data flow for the connections synapses may be performed in parallel. The numerous weights (e.g., connections) in the neural network may need memory to store their values for repeated use or update, and the memory size require by weights is usually much more than that required by other data, such as neuron activation states, input data, etc.

Due to limitations in cache memory size and memory speeds, performance of a relatively large neural network may be impaired. Attempts have been made to reduce memory size requirements. For example, neural networks may be partitioned into two equal or roughly equal branches to speed up computation by either (1) using two or more processors or (2) reducing number of synapses by partitioning. The former simply takes the advantage of multiple processors without any changes in the network architecture, and the latter is prone to accuracy loss due to approximation from trimming the synapses between partitions.

Each layer of a neural network may have a relatively large number of neurons and, therefore, a number of connections between adjacent layers of the neural network may be large. More specifically, if two adjacent layers of a neural network have M and N numbers of neurons, the number of connections between the two adjacent layers is $M*N$. For example, if a number of neurons M in a layer is equal to 1024 and a number of neurons N in an adjacent layer is equal to 64, the number of connections between the two adjacent layers is $1024*64=65,536$.

According to various embodiments of the present disclosure, a layer may be inserted between two adjacent layers of a neural network. For example, a layer (also referred to herein as an "insertion layer") may be inserted between one layer (e.g., the last convolutional layer) and another layer (e.g., the first FC (fully-connected) layer) in a conventional convolutional neural network (CNN).

In one non-limiting example wherein two adjacent layers of a neural network include N and M neurons, an insertion layer having a number of neurons P may be inserted and connected between the two layers. In this example, the number of connections between the two layers becomes $M*P+P*N$. The number of neurons P may be selected such that the number of connections between the two layers is reduced.

Alternatively or additionally, in some embodiments, a layer of a neural network may be replaced by another layer (a "replacement layer"). For example, a layer (e.g., the first FC layer) in a neural network (e.g., a CNN) may be replaced by a replacement layer, wherein the replacement layer has a number of neurons less than a number of neurons of the layer being replaced.

Reducing number of connections between layers in a neural network may cause a reduction in accuracy. Thus, in some embodiments, the number of neurons in an insertion layer and/or a replacement layer may be selected to maintain the accuracy of the neural network (e.g., above a degree of accuracy threshold). Stated another way, an insertion layer and/or a replacement layer may include a sufficient number of neurons to maintain the level of performance (e.g., degree of accuracy) of a neural network at a definable level (e.g., above a level of performance threshold, which may include a degree of accuracy threshold).

Further, according to some embodiments, one or more characteristics of an insertion layer and/or a replacement layer of a neural network may be definable. More specifically, as described more fully below, an insertion layer and/or a replacement layer may have one or more defined segments, wherein one or more characteristics (e.g., segment sizes, neuron activations, etc.) of each segment of the one or more segments may be adjusted to enhance performance of the neural network. Variant segments in a layer with definable characteristics may enhance the accuracy of a neural network, and may improve computational speed.

Alternatively or additionally, one or more characteristics of one or more connections between layers in a neural network (e.g. between an insertion layer and another layer, between a replacement layer and another layer, between an insertion layer and a replacement layer) may be adjusted. More specifically, for example, weight initialization methods, a fraction of fixed-weight synapses, and/or a fraction of inactive synapses may be adjusted to enhance performance of a neural network.

Various embodiments as disclosed herein, which may implemented in various application (e.g., computer vision and pattern recognition) may reduce the memory requirement, improve energy efficiency, and/or speed up computation, while maintaining comparable accuracy.

Embodiments of the present disclosure are now explained with reference to the accompanying drawings.

Figure 1:
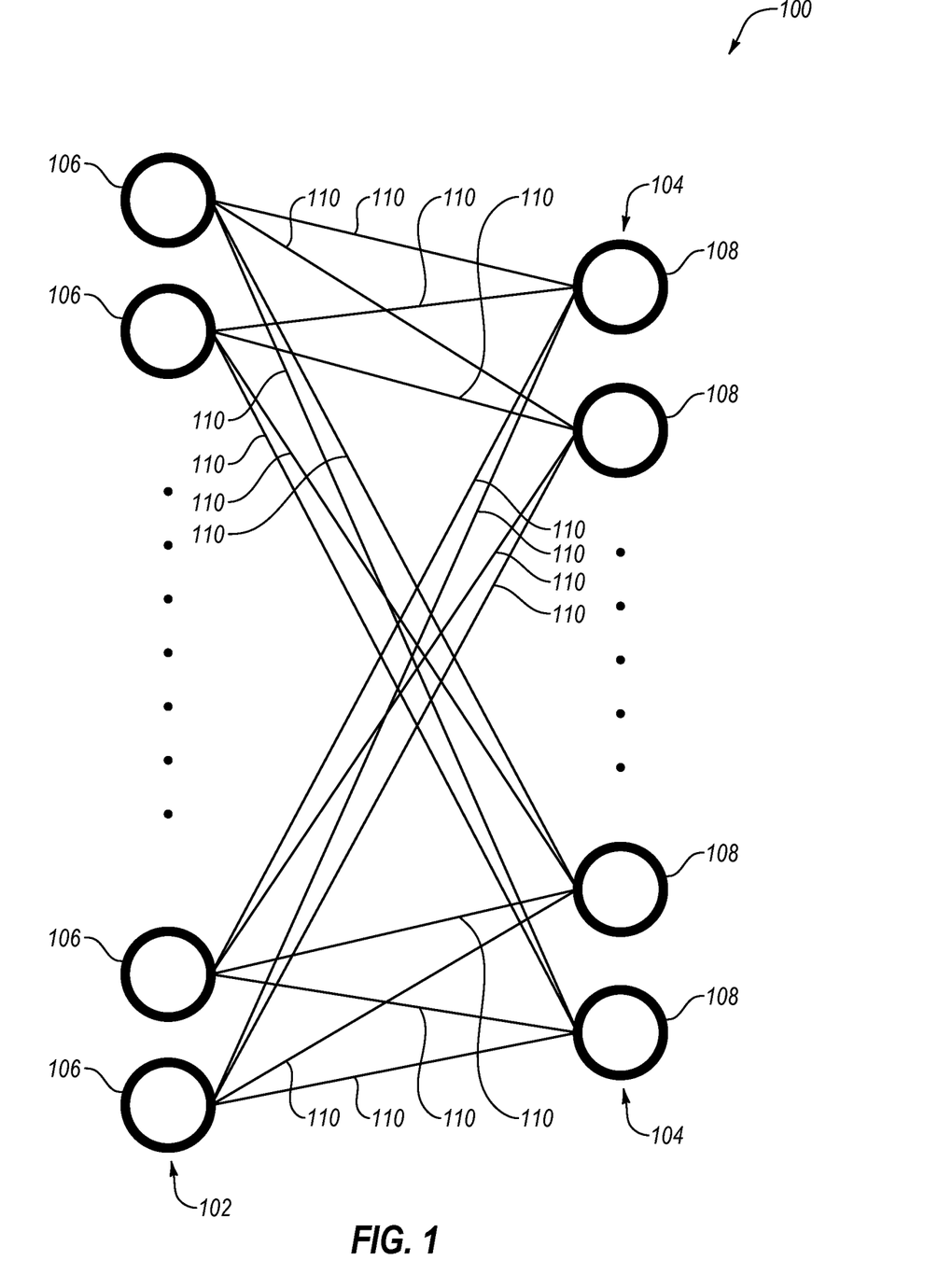
FIG. 1 depicts two layers of an example neural network.

FIG. 1 depicts two adjacent layers of a neural network 100. More specifically, network 100 includes a layer 102, which includes neurons 106, and a layer 104, which includes neurons 108. Further, synaptic connections 110 (also referred to herein as "synapses") connect each neuron of a layer with each neuron of an adjacent layer. More specifically, synaptic connections 110 connect each neuron 106 of layer 102 with each neuron 108 of layer 104.

Figure 2:
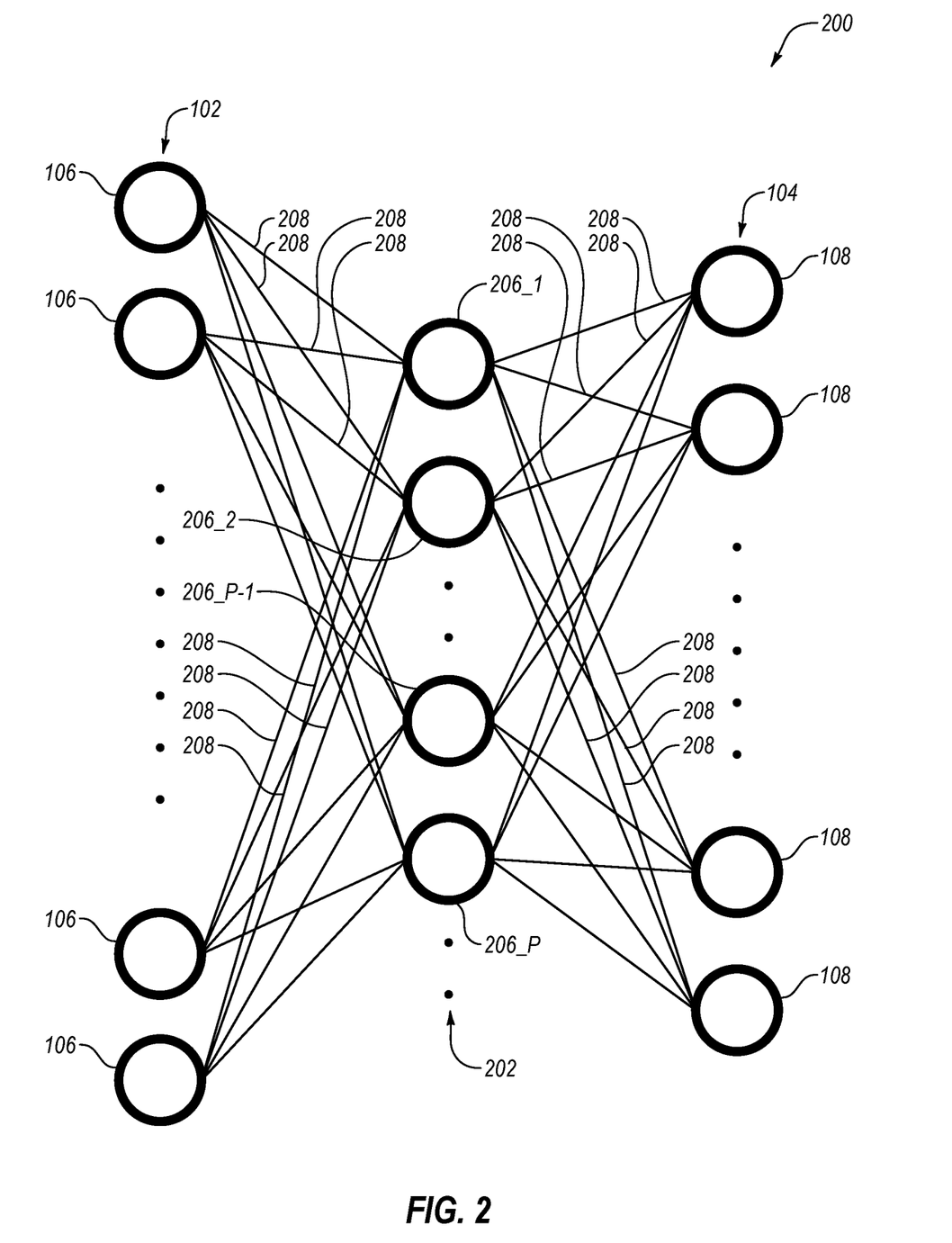
FIG. 2 depicts an example neural network including an insertion layer.

FIG. 2 depicts a neural network 200 including layer 102, which includes neurons 106, and layer 104, which includes neurons 108. Further, according to various embodiments, neural network 200 includes an insertion layer 202, which includes neurons 206_1-206_P. In one example, layer 102 includes M neurons, layer 104 includes N neurons, and layer 202 includes P neurons, wherein P may be selected according to the following equation:

$$P < \frac{M \times N}{M + N}. \quad (1)$$

For example, if M=1024 and N=64, P may be a value less than or equal to 60. In one example, if P=59, upon insertion of layer 202, the number of connections between layers 102 and 104 is 1024*59+59*64=64,192. Thus, in this example, the number of connections has been reduced from 65,536 to 64,192. Further, as long as a desired level of performance (e.g., a degree of accuracy) is maintained, the number of neurons P may be adjusted (e.g., decreased) to further enhance performance. For example, P may be set equal to 40, which would further decrease the number of connections to 43,520.

In some embodiments, one or more neurons of a layer (e.g., neurons 206 of insertion layer 202), and associated synapses, may be divided into one or more segments. For example, each segment may include one or more neurons and one or more synapses, which connects the one or more neurons in a segment to one or more neurons in another layer. According to various embodiments, each segment may have one or more variable characteristics, such as neuron activation methods (e.g., defining an output of a neuron given an input or set of inputs), weight initialization methods (e.g., defining values for the synapses and/or a distribution of values for the synapses), fraction of inactive neurons (e.g., defining a fraction of neurons that are inactive (e.g., not engaged in computation)), fraction of fixed-weight synapses (e.g., defining a fraction of synapses, and possibly which one or more synapses, may not be updated after initialization), fraction of inactive synapses (e.g., defining a fraction of synapses that are inactive (e.g., not engaged in computation)), etc. It is noted that inactive neurons and/or inactive synapses may be randomly selected. According to various embodiments, a neural network may include one or more segment-dependent characteristics and/or one or more segment-independent characteristics, as described more fully below.

For example, neurons 206_1 and 206_2 of neural network 200 may be included in one segment, and thus each of neuron 206_1 and neuron 206_2, and each synapses connecting either neuron 206_1 or neuron 206_2 to another neuron, may have one or more defined characteristics. More specifically, in an example wherein neurons 206_1 and 206_2 are included in a segment, each of neurons 206_1 and 206_2 may have the same defined neuron characteristics, and each synapses 208 connecting either neuron 206_1 or neuron 206_2 to another neuron in an another layer may have the same defined synapses characteristics. Variable characteristics in neurons and/or synapses in a neural network may provide for enhanced performance (e.g., via reducing likelihood of being trapped at a local minima).

Figure 3:
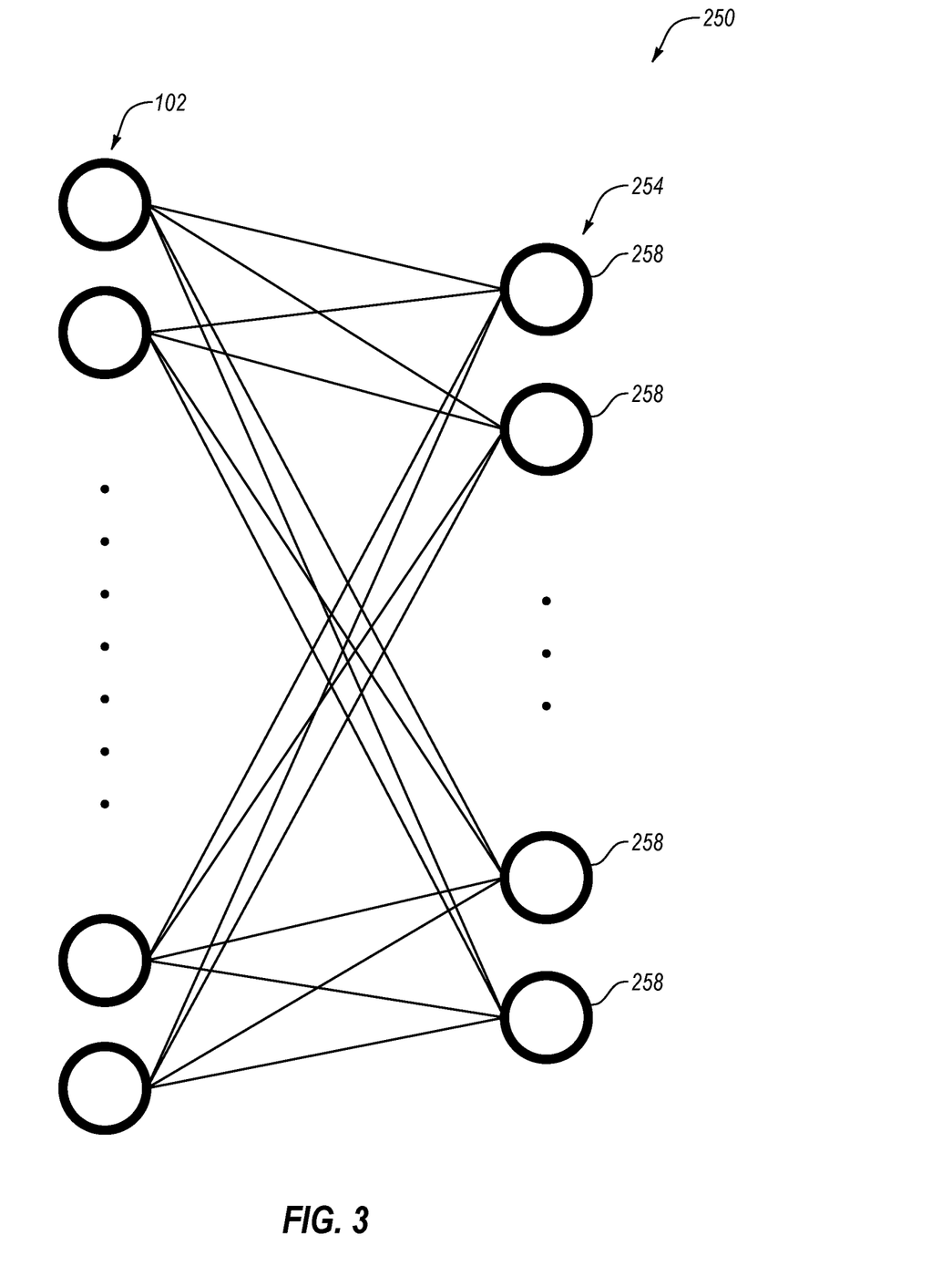
FIG. 3 depicts an example neural network including a replacement layer.

FIG. 3 depicts a neural network 250 including layer 102, which includes neurons 106. Further, in contrast to neural network 100 shown in FIG. 1, neural network 250 includes a layer 254 rather than layer 104, which includes N neurons. Layer 254, which may also be referred to herein as a "replacement layer," includes neurons 258. In one example, layer 258 includes X neurons, wherein X<N. Thus, for example, layer 104 of neural network 100 (see FIG. 1) has been replaced by layer 258, wherein a number of neurons in layer 258 is less than a number of neurons in layer 104.

Figure 4:
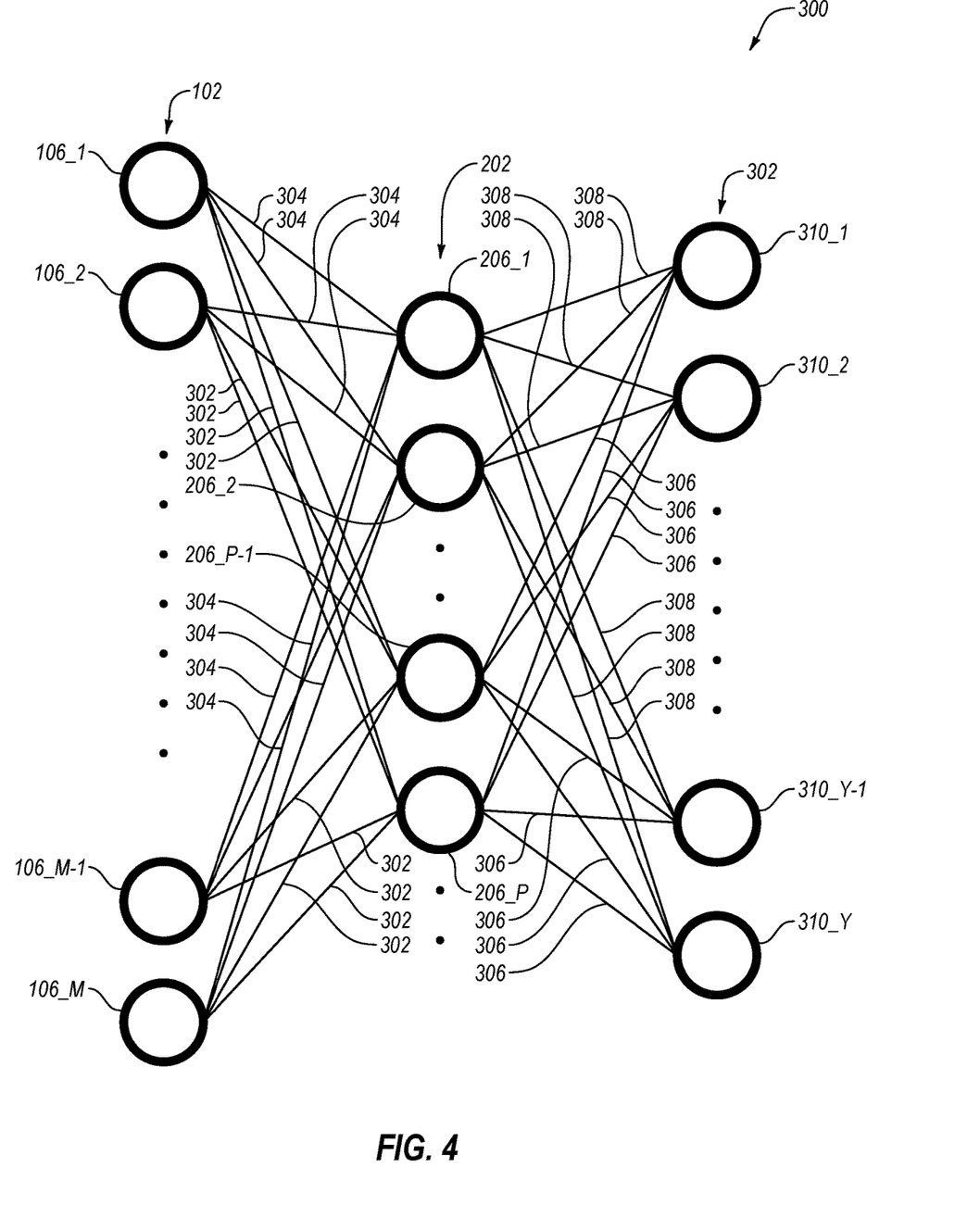
FIG. 4 depicts an example neural network including an insertion layer and a replacement layer.

FIG. 4 depicts a neural network 300 including layer 102, which includes neurons 106_1-106_M, and insertion layer 202, which includes neurons 206_1-206_P. Further, in contrast to neural network 200 shown in FIG. 2, neural network 300 includes a layer 302 rather than layer 104, which includes N neurons. Layer 302 includes neurons 310_1-310_Y. In one example, layer 302 includes Y neurons, wherein Y<N.

Further, characteristics of neural network 300, including characteristics of one or more neurons and/or characteristics of one or more synapses may be defined. Characteristics of a neural network may include, but are not limited to, neuron activation methods, a fraction of inactive neurons, weight initialization methods, fraction of fixed-weight synapses, and fraction of inactive synapses. Further, one or more characteristics may be defined as segment-dependent characteristics and one or more characteristics may be defined as segment-independent characteristics.

For example, one segment of layer 202 may include neurons 206_1 and 206_2 and another segment of layer 202 may include neurons 206_P−1 and 206_P. Thus, in this example, neurons 206_1 and 206_2, and associated synapses 304 and 308, may have one or more defined segment-dependent characteristics. Moreover, neurons 206_P−1 and 206_P, and associated synapses 304 and 306, may have one or more defined segment-dependent characteristics. Neural network 300 may also include one or more segment-independent characteristics.

Figure 5:
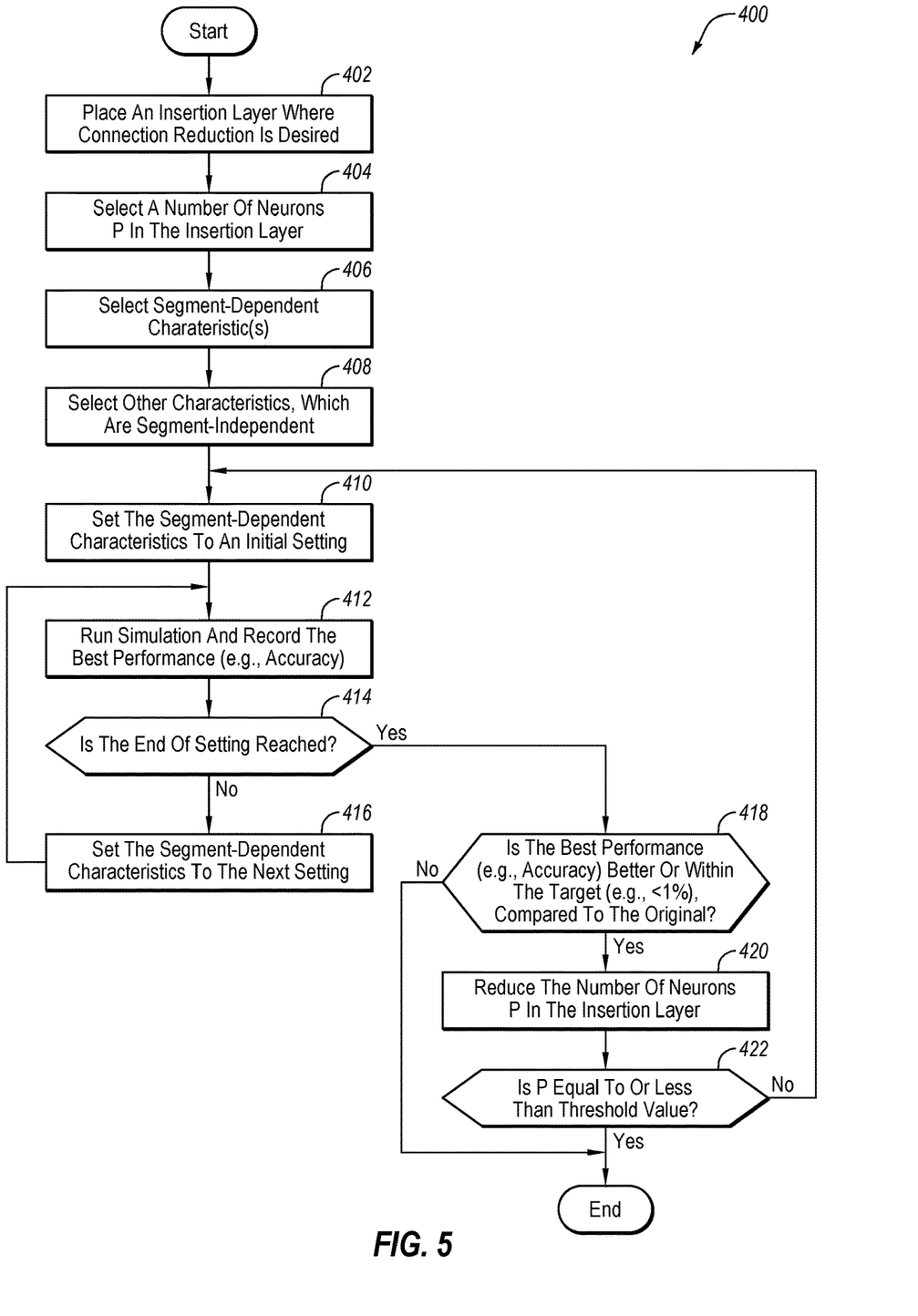
FIG. 5 is a flowchart of an example method of inserting a layer into a neural network.

FIG. 5 is a flowchart of an example method 400 inserting a layer into a neural network, in accordance with at least one embodiment of the present disclosure. Method 400 may be performed by any suitable system, apparatus, or device. For example, a device 800 of FIG. 9 or one or more of the components thereof may perform one or more of the operations associated with method 400. In these and other embodiments, program instructions stored on a computer readable medium may be executed to perform one or more of the operations of method 400.

At block 402, an insertion layer may be added to a neural network, and method 400 may proceed to block 404. For example, the insertion layer (e.g., insertion layer 202; see FIG. 2) may be positioned between and connected to layers 102 and 104 of neural network 200. Moreover, an insertion layer may be added between layers (e.g., layers 102 and 104) to reduce a number of connections between the two layers.

At block 404, a number of neurons in the insertion layer may be selected, and method 400 may proceed to block 406. A number of neurons for insertion layer may be selected such that a number of connections between previously adjacent layers is reduced. More specifically, for example, with reference to FIG. 2, if layer 102 has M neurons and layer 104 has N neurons, the number of neurons P in the insertion layer may be selected such that $$P < \frac{M \times N}{M + N}.$$

Figure 6:
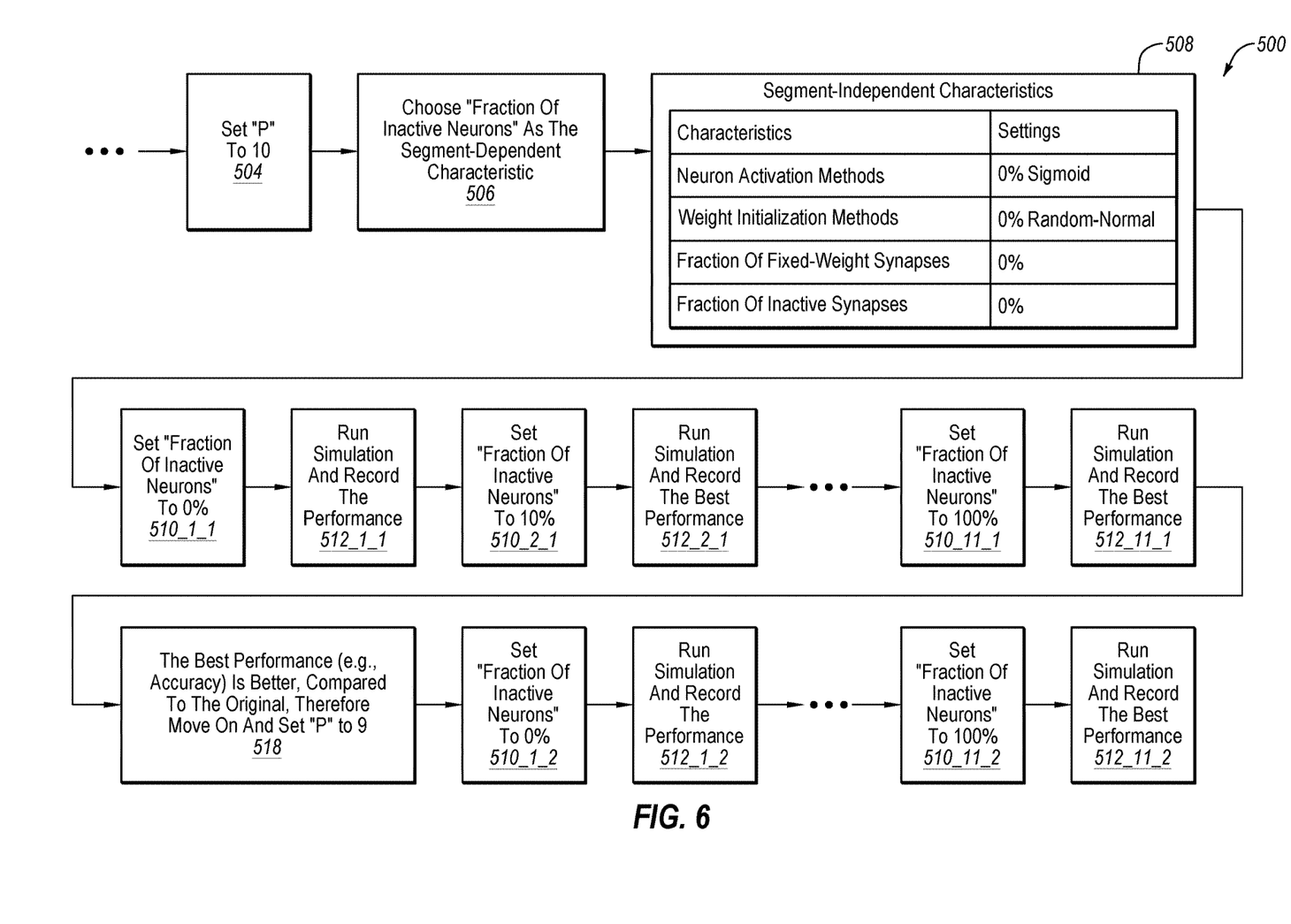
FIG. 6 is a flowchart of an example scenario of inserting a layer into a neural network.

For example, with reference to FIG. 6, which is a flowchart 500 depicting an example scenario of inserting a layer into a neural network, at block 504, a number of neurons P of insertion layer may be set equal to 10.

With reference again to FIG. 5, at block 406, one or more segment-dependent characteristics for the insertion layer may be selected, and method 400 may proceed to block 408. For example, one or more of "neuron activation methods," "fraction of inactive neurons," "weight initialization methods," "fraction of fixed-weight synapses", and "fraction of inactive synapses" may be selected as segment-dependent characteristics. As a more specific example, with reference again to FIG. 6, at block 506, the "fraction of inactive neurons" characteristic may be selected as a segment-dependent characteristic.

With reference again to FIG. 5, at block 408, one or more segment-independent characteristics for the insertion layer may be selected and set to a value, and method 400 may proceed to block 410. For example, one or more of "neuron activation methods," "fraction of inactive neurons," "weight initialization methods," "fraction of fixed-weight synapses", and "fraction of inactive synapses" may be selected as segment-independent characteristics and set to a value. As a more specific example, with reference again to FIG. 6, at block 508, "neuron activation methods," "weight initialization methods," "fraction of fixed-weight synapses", and "fraction of inactive synapses" characteristics may be selected as segment-independent characteristics, and each segment-independent characteristic may be set to a 0% value.

With reference again to FIG. 5, at block 410, the one or more selected segment-dependent characteristics for the insertion layer may be set to an initial setting, and method 400 may proceed to block 412. For example, with reference again to FIG. 6, at block 510_1_1?, the "fraction of inactive neurons" characteristic may be set to 0%.

With reference again to FIG. 5, at block 412, a simulation of the neural network including the insertion layer may be performed, and a level of performance may be determined, and possibly recorded, and method 400 may proceed to block 414. For example, with reference again to FIG. 6, at block 512_1_1, a simulation may be performed and the level of performance (e.g., degree of accuracy) of the neural network may be determined, and possibly recorded.

With reference again to FIG. 5, at block 414, a determination as to whether each setting for the one or more selected segment-dependent characteristics for the insertion layer has been simulated. If each setting has been simulated, method 400 may proceed to block 418. If each setting of the one or more selected segment-dependent characteristics for the insertion layer has not been simulated, method 400 may proceed to block 416.

At block 416, the one or more selected segment-dependent characteristics for the insertion layer may be set to another setting. For example, with reference again to FIG. 5, at block 510_2_1, the "fraction of inactive neurons" characteristic may be set to 10%.

The operations at blocks 412, 414, and 416 may be performed for each setting for the one or more selected segment-dependent characteristics. For example, with reference again to FIG. 6, at each block 510_1_1-510_11_1, the "fraction of inactive neurons" characteristic setting be modified (e.g., increased to 100% in 10% increments) and, at each blocks 512_1_1, 512_2_1-512_11_11_1, a simulation may be performed and the level of performance (e.g., degree of accuracy) of the neural network may be determined, and possibly recorded, for the associated setting. After each setting has been simulated, method 500 may proceed to block 518.

With reference again to FIG. 5, at block 418, a determination may be made as to whether the best determined level of performance is within a threshold value of the level of performance of the neural network without the insertion layer. For example, it may be determined whether the best determined degree of accuracy for the neural network including the insertion layer is better than or within, for example, a percentage (e.g., 1%, 5%, 7%) of the degree accuracy of the neural network without the insertion layer. If the best determined level of performance is not within a threshold value of the level of performance of the neural network without the insertion layer, method 400 may end. If the best determined level of performance is within a threshold value of the level of performance of the neural network without the insertion layer, method 400 may proceed to block 420.

At block 420, the number of neurons P in the insertion layer may be reduced, and method 400 may proceed to block 422. For example only, the number of neurons P in the insertion layer may be reduced by one, five, ten, or any other integer. As a more specific example, with reference again to FIG. 6, at block 518, if the best determined level performance is within a threshold value of the level performance of the neural network without the insertion layer, the number of neurons P in the insertion layer may set to nine.

With reference again to FIG. 5, at block 422, a determination may be made as to whether the number of neurons P in the insertion layer is less than or equal to a threshold value. For example, a determination may be made as to whether the number of neurons P in the insertion layer is equal to or less than zero. If the number of neurons P in the insertion layer is less than or equal to a threshold value, method 400 may end. If the number of neurons P in the insertion layer is greater than the threshold value, method 400 may revert back to block 410, where the one or more selected segment-dependent characteristics for the insertion layer may be set to the initial setting. For example, with reference again to FIG. 6, at block 510_1_2, the "fraction of inactive neurons" characteristic may be set to 0%.

As noted above, the operations at blocks 412, 414, and 416 may performed for each setting of the one or more selected segment-dependent characteristics. For example, with reference again to FIG. 6, at each block 510_1_2- 510_11_2, the "fraction of inactive neurons" characteristic setting be modified (e.g., increased to 100% in 10% increments) and, at each blocks 512_1_2-512_11_2, a simulation may be performed and the level of performance of the neural network may be determined, and possibly recorded, for the associated setting.

Further, operations at blocks 410, 412, 414, 416, 418, 420, and 422, as illustrated in FIG. 5, may be repeated for each possible number of neurons P in the insertion layer. Thus, method 400 may provide a determination of an optimal number of neurons P in the insertion layer, as well as an optimal setting for one or more segment-dependent characteristics.

Modifications, additions, or omissions may be made to method 400 without departing from the scope of the present disclosure. For example, the operations of method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 7:
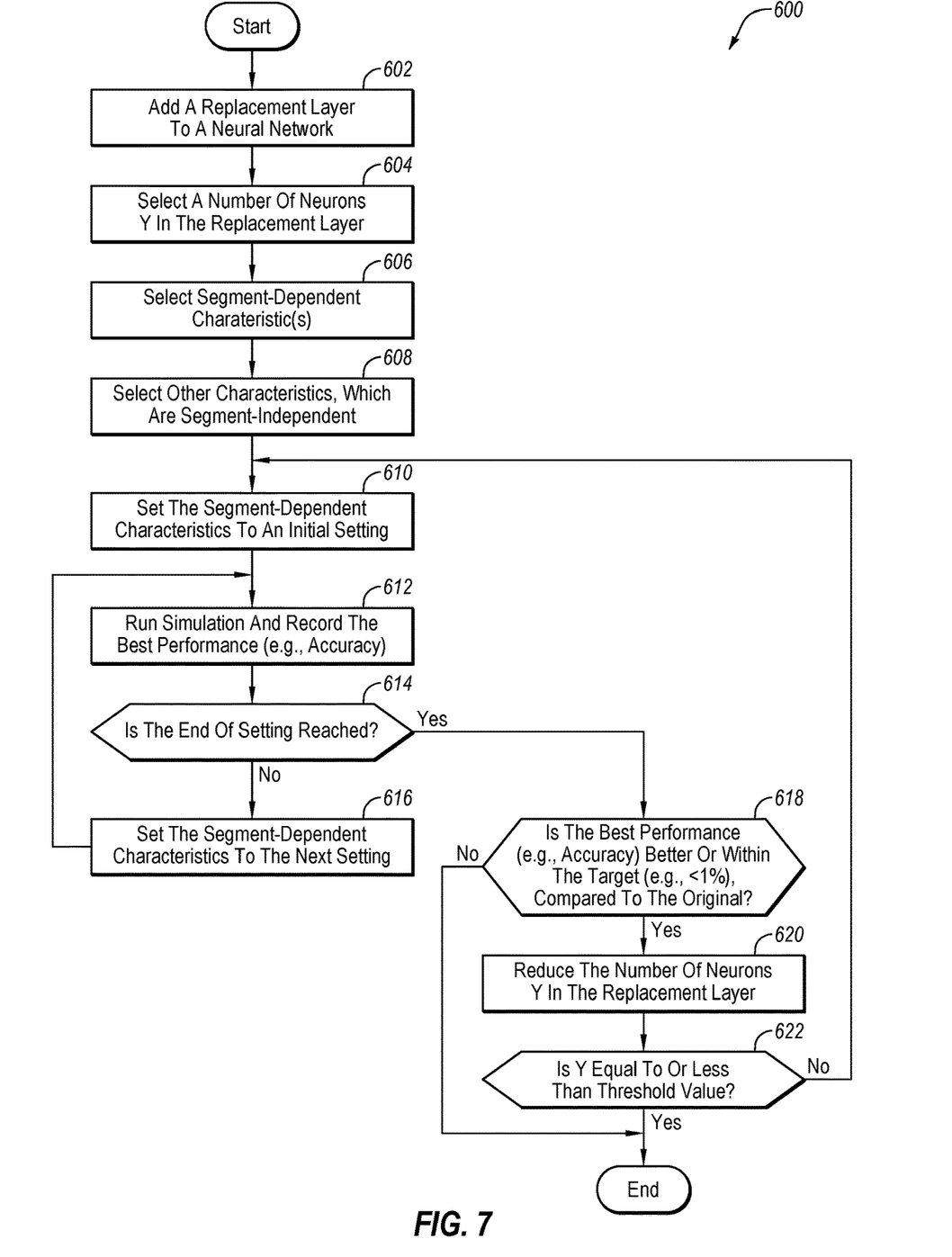
FIG. 7 is a flowchart of an example method of replacing a layer in a neural network with a replacement layer.

FIG. 7 is a flowchart of an example method 600 for replacing a layer in a neural network, in accordance with at least one embodiment of the present disclosure. Method 600 may be performed by any suitable system, apparatus, or device. For example, device 800 of FIG. 9 or one or more of the components thereof may perform one or more of the operations associated with method 600. In these and other embodiments, program instructions stored on a computer readable medium may be executed to perform one or more of the operations of method 600.

At block 602, a replacement layer may be added to a neural network, and method 600 may proceed to block 604. For example, the replacement layer (e.g., replacement layer 302; see FIG. 4) may replace a layer (e.g., layer 104; see FIG. 2) of neural network 200 (see FIG. 2).

Figure 8:
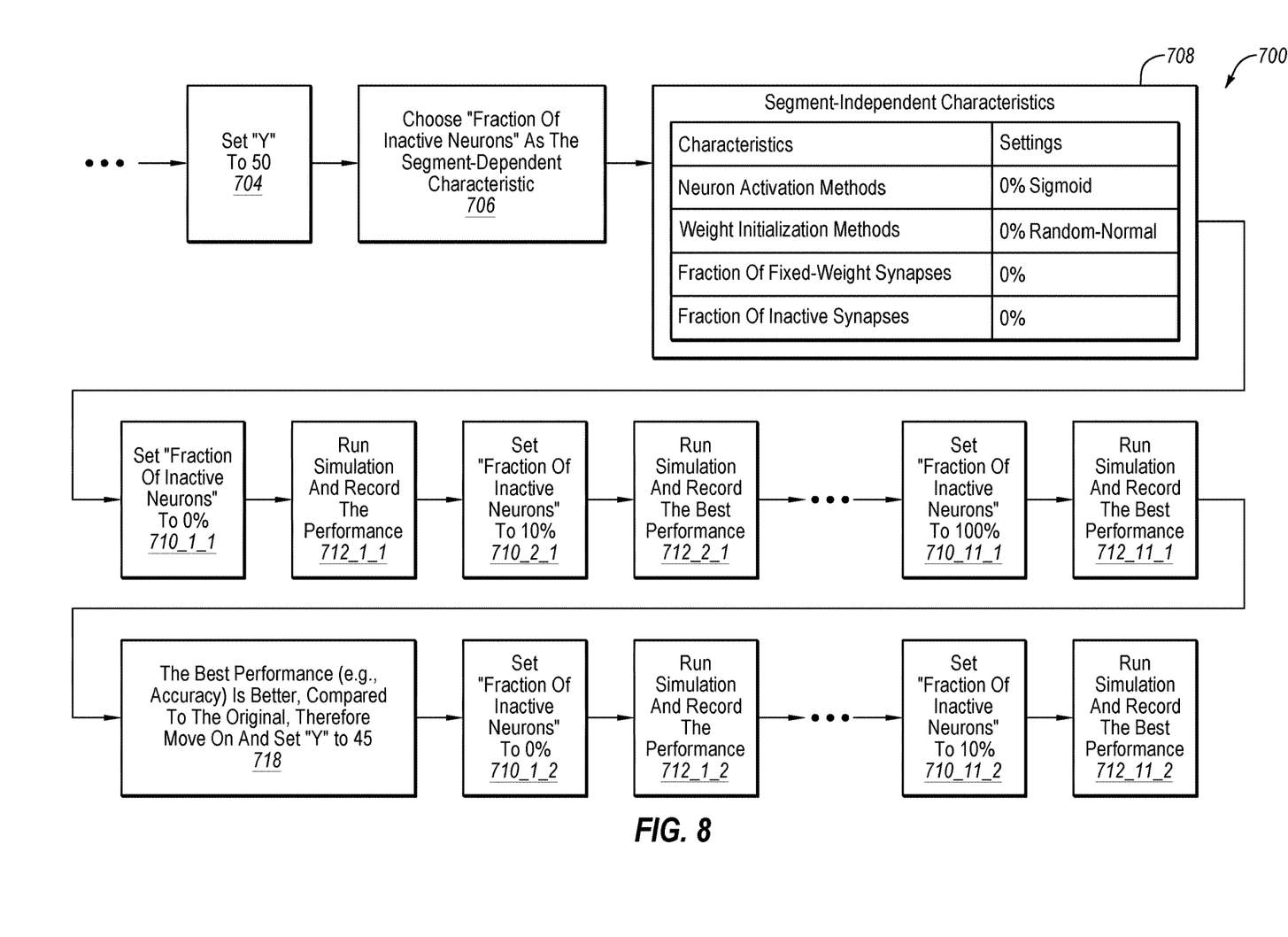
FIG. 8 is a flowchart of an example scenario of replacing a layer in a neural network with a replacement layer.

At block 604, a number of neurons in the insertion layer may be selected, and method 600 may proceed to block 606. A number of neurons for the replacement layer may be selected such that a number of connections is reduced. More specifically, for example, with reference to FIGS. 1 and 3, if layer 104 has N neurons, the number of neurons Y in replacement layer 254 may be selected such that Y<N. For example, with reference to FIG. 8, which is a flowchart 700 depicting an example scenario for replacing a layer in a neural network, at block 704, the number of neurons Y in the replacement layer may be set equal to 50.

With reference again to FIG. 7, at block 606, one or more segment-dependent characteristics for the replacement layer may be selected, and method 600 may proceed to block 608. For example, one or more of "neuron activation methods," "fraction of inactive neurons," "weight initialization methods," "fraction of fixed-weight synapses", and "fraction of inactive synapses" may be selected as segment-dependent characteristics. As a more specific example, with reference again to FIG. 8, at block 706, the "fraction of inactive neurons" characteristic may be selected as a segment-dependent characteristic.

With reference again to FIG. 7, at block 608, one or more segment-independent characteristics for the replacement layer may be selected and set to a value, and method 600 may proceed to block 610. For example, one or more of "neuron activation methods," "fraction of inactive neurons," "weight initialization methods," "fraction of fixed-weight synapses", and "fraction of inactive synapses" may be selected as segment-independent characteristics and set to a value. As a more specific example, with reference again to FIG. 8, at block 708, "neuron activation methods," "weight initialization methods," "fraction of fixed-weight synapses", and "fraction of inactive synapses" characteristics may be selected as segment-independent characteristics, and each segment-independent characteristic may be set to a 0% value.

With reference again to FIG. 7, at block 610, the one or more selected segment-dependent characteristics for the replacement layer may be set to an initial setting, and method 600 may proceed to block 612. For example, with reference again to FIG. 8, at block 710, the "fraction of inactive neurons" characteristic may be set to 0%.

With reference again to FIG. 7, at block 612, a simulation of the neural network including the replacement layer may be performed, and the level of performance may be determined, and possible recorded, and method 600 may proceed to block 614. For example, with reference again to FIG. 8, at block 712_1_1, a simulation may be performed and the level of performance (e.g., degree of accuracy) of the neural network may be determined, and possibly recorded.

With reference again to FIG. 7, at block 614, a determination as to whether each setting for the one or more selected segment-dependent characteristics for the replacement layer has been simulated. If each setting has been simulated, method 600 may proceed to block 618. If each setting of the one or more selected segment-dependent characteristics for the insertion layer has not been simulated, method 600 may proceed to block 616.

At block 616, the one or more selected segment-dependent characteristics for the replacement layer may be set to another setting. For example, with reference again to FIG. 8, at block 710_2_1, the "fraction of inactive neurons" characteristic may be set to 10%.

The operations at blocks 612, 614, and 616 may performed for each setting for the one or more selected segment-dependent characteristics. For example, with reference again to FIG. 8, at each block 710_1_1-710_11_1, the "fraction of inactive neurons" characteristic setting be modified (e.g., increased to 100% in 10% increments) and, at each blocks 712_1_1, 712_2_1-712_11_1, a simulation may be performed and the level of performance (e.g., degree of accuracy) of the neural network may be determined, and possibly recorded, for the associated setting. After each setting has been simulated, method 700 may proceed to block 718.

With reference again to FIG. 7, at block 618, a determination may be made as to whether the best determined level of performance is within a threshold value of the level of performance of the neural network with the original layer (e.g., layer 104; see FIG. 2) and without the replacement layer (e.g., layer 302; see FIG. 4). For example, it may be determined whether the best determined degree of accuracy for the neural network including the replacement layer is better than or within, for example, a percentage (e.g., 1%, 5%, 7%) of the degree of accuracy of the neural network without the replacement layer. If the best determined level of performance is not within a threshold value of the level of performance of the neural network without the replacement layer, method 600 may end. If the best determined level of performance is within a threshold value of the level of performance of the neural network without the replacement layer, method 600 may proceed to block 620.

At block 620, the number of neurons Y in the replacement layer may be reduced, and method 600 may proceed to block 622. For example only, the number of neurons Y in the replacement layer may be reduced by one, five, ten, or any other integer. As a more specific example, with reference again to FIG. 8, at block 718, if the best determined level of performance is within a threshold value of the level of performance of the neural network without the replacement layer, the number of neurons Y in the insertion layer may set to 45.

With reference again to FIG. 7, at block 622, a determination may be made as to whether the number of neurons Y in the replacement layer is less than or equal to a threshold value. For example, a determination may be made as to whether the number of neurons Y in the replacement layer is equal to or less than zero. If the number of neurons Y in the replacement layer is less than or equal to a threshold value, method 600 may end. If the number of neurons Y in the replacement layer is greater than the threshold value, method 600 may revert back to block 610, where the one or more selected segment-dependent characteristics for the replacement layer may be set to the initial setting. For example, with reference again to FIG. 8, at block 710_1_2, the "fraction of inactive neurons" characteristic may be set to 0%.

As noted above, the operations at blocks 612, 614, and 616 may performed for each setting for the one or more selected segment-dependent characteristics. For example, with reference again to FIG. 8, at each block 710_1_2-710_11_2, the "fraction of inactive neurons" characteristic setting be modified (e.g., increased to 100% in 10% increments) and, at each blocks 712_1_2-712_11_2, a simulation may be performed and the level of performance (e.g., degree of accuracy) of the neural network may be determined, and possibly recorded, for the associated setting.

Further, the operations at blocks 610, 612, 614, 616, 618, 620, and 622 may be repeated for each possible number of neurons Y in the replacement layer. Thus, method 600 may provide a determination of an optimal number of neurons Y in the replacement layer, as well as an optimal setter for one or more segment-dependent characteristics.

Modifications, additions, or omissions may be made to method 600 without departing from the scope of the present disclosure. For example, the operations of method 600 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 9:
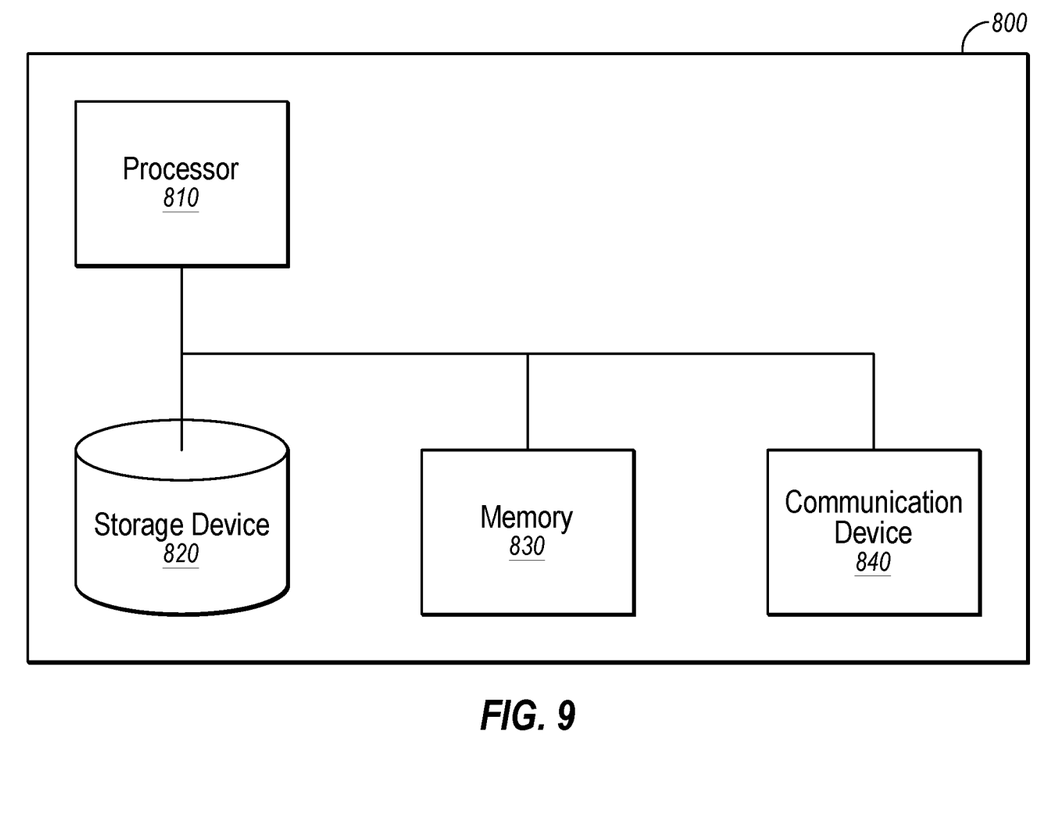
FIG. 9 is a block diagram of an example computing device.

FIG. 9 is a block diagram of an example computing device 800, in accordance with at least one embodiment of the present disclosure. Computing device 800 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing device 800 may include a processor 810, a storage device 820, a memory 830, and a communication device 840. Processor 810, storage device 820, memory 830, and/or communication device 840 may all be communicatively coupled such that each of the components may communicate with the other components. Computing device 800 may perform any of the operations described in the present disclosure.

In general, processor 810 may include any suitable special-purpose or general-purpose computer, computing entity, or processing device including various computer hardware or software modules and may be configured to execute instructions stored on any applicable computer-readable storage media. For example, processor 810 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 9, processor 810 may include any number of processors configured to perform, individually or collectively, any number of operations described in the present disclosure.

In some embodiments, processor 810 may interpret and/or execute program instructions and/or process data stored in storage device 820, memory 830, or storage device 820 and memory 830. In some embodiments, processor 810 may fetch program instructions from storage device 820 and load the program instructions in memory 830. After the program instructions are loaded into memory 830, processor 810 may execute the program instructions.

For example, in some embodiments one or more of processing operations for generating an insertion layer and/or a replacement layer in a neural network may be included in data storage 820 as program instructions. Processor 810 may fetch the program instructions of one or more of the processing operations and may load the program instructions of the processing operations in memory 830. After the program instructions of the processing operations are loaded into memory 830, processor 810 may execute the program instructions such that computing device 800 may implement the operations associated with the processing operations as directed by the program instructions.

Storage device 820 and memory 830 may include computer-readable storage media for carrying or having computer-executable instructions or data structures stored thereon. Such computer-readable storage media may include any available media that may be accessed by a general-purpose or special-purpose computer, such as processor 810. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 810 to perform a certain operation or group of operations.

In some embodiments, storage device 820 and/or memory 830 may store data associated with generating neural networks, and more specifically, generating insertion layers and/or replacement layers for a neural network. For example, storage device 820 and/or memory 830 may store characteristic settings (e.g., segment-dependent and/or segment-independent characteristic settings), simulation results, data related to a number of neurons in an insertion layer and/or replacement layer, etc.

Communication device 840 may include any device, system, component, or collection of components configured to allow or facilitate communication between computing device 800 and another electronic device. For example, communication device 840 may include, without limitation, a modem, a network card (wireless or wired), an infrared communication device, an optical communication device, a wireless communication device (such as an antenna), and/or chipset (such as a Bluetooth® device, an 802.6 device (e.g. Metropolitan Area Network (MAN)), a Wi-Fi device® , a WiMAX® device, cellular communication facilities, etc.), and/or the like. Communication device 840 may permit data to be exchanged with any network such as a cellular network, a Wi-Fi® network, a MAN, an optical network, etc., to name a few examples, and/or any other devices described in the present disclosure, including remote devices.

Modifications, additions, or omissions may be made to FIG. 9 without departing from the scope of the present disclosure. For example, computing device 800 may include more or fewer elements than those illustrated and described in the present disclosure. For example, computing device 800 may include an integrated display device such as a screen of a tablet or mobile phone or may include an external monitor, a projector, a television, or other suitable display device that may be separate from and communicatively coupled to computing device 800.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of modifying a neural network, comprising:
    identifying a first layer of a neural network and a second layer of the neural network adjacent to the first layer of the neural network, wherein a first connection number of neuron connections are between the first layer and the second layer;
    selecting a first number "P" of insertion neurons for an insertion layer of the neural network, the first number "P" of insertion neurons in the insertion layer being less than a number "M" of first neurons in the first layer of the neural network and less than a number "N" of second neurons in the second layer of the neural network, wherein "P" is calculated according to the following equation:

$$P < (M \times N)/(M + N);$$

modifying the neural network by inserting the insertion layer between the first layer and the second layer of the neural network, wherein the first number of insertion neurons is also selected based on the first number of insertion neurons being such that a second connection number of neuron connections between the insertion layer and the first layer and between the insertion layer and the second layer is less than the first connection number of neuron connections between the first layer and the second layer;

segmenting the insertion layer into a first segment and a second segment;

selecting a first characteristic for the first segment, the first characteristic including one or more of: a fraction of inactive neurons, weight initialization methods, a fraction of fixed-weight synapses, and a fraction of inactive synapses;

selecting a second characteristic for the second segment, the second characteristic including one or more of: a fraction of inactive neurons, weight initialization methods, a fraction of fixed-weight synapses, and a fraction of inactive synapses obtaining a first value and a second value for the first characteristic obtaining a first value and a second value for the second characteristic;

determining a first performance of the modified neural network using the first value of the first characteristic as applied to the first segment and using the first value of the second characteristic as applied to the second segment;

determining a second performance of the modified neural network using the second value of the first characteristic as applied to the first segment and using the second value of the second characteristic as applied to the second segment; and in response to at least one of the first performance and the second performance satisfying a performance threshold, modifying the modified neural network by replacing the insertion layer with an updated layer having a second number of neurons, wherein the second number is less than the first number and the performance threshold is based on performance of the neural network without the insertion layer inserted.

2. The method of claim 1, further comprising setting the at least one of the first characteristic or the second characteristic to one of a plurality of settings to enhance a performance of the insertion layer.

3. The method of claim 1, further comprising selecting the second number of neurons for the updated layer based on the second number of neurons for the updated layer increasing efficiency as compared to that of the insertion layer while maintaining a level of performance greater than the performance threshold.

4. One or more non-transitory computer-readable media that include instructions that, when executed by one or more processors, are configured to cause the one or more processors to perform operations, the operations comprising:

identifying a first layer of a neural network and a second layer of the neural network adjacent to the first layer of the neural network, wherein a first connection number of neuron connections are between the first layer and the second layer;

selecting a first number of replacement neurons for a replacement layer of the neural network, the first number of replacement neurons in the replacement layer being less than a number of first neurons in the first layer of the neural network;

modifying the neural network by replacing the first layer with the replacement layer to reduce a number of connections in the neural network, wherein the first number of replacement neurons is also selected based on the first number of replacement neurons being such that a second connection number of neuron connections are between the replacement layer and the second layer and the second connection number is less than the first connection number;

segmenting the replacement layer into a first segment and a second segment;

selecting a first characteristic for the first segment, the first characteristic including one or more of: a fraction of inactive neurons, weight initialization methods, a fraction of fixed-weight synapses, and a fraction of inactive synapses;

selecting a second characteristic for the second segment, the second characteristic including one or more of: a fraction of inactive neurons, weight initialization methods, a fraction of fixed-weight synapses, and a fraction of inactive synapses;

obtaining a first value and a second value for the first characteristic;

obtaining a first value and a second value for the second characteristic;

determining a first performance of the modified neural network using the first value of the first characteristic as applied to the first segment and using the first value of the second characteristic as applied to the second segment;

determining a second performance of the modified neural network using the second value of the first characteristic as applied to the first segment and using the second value of the second characteristic as applied to the second segment; and in response to at least one of the first performance and the second performance satisfying a performance threshold, modifying the modified neural network by inserting an insertion layer between the replacement layer and the second layer, the insertion layer having a second number of insertion neurons, wherein the second number is less than the first number of replacement neurons and is less than a third number of second neurons of the second layer in which the second number is represented by "P", the first number is represented by "M" and the third number is represented by "N", and "P" is calculated according to the following expression:

$$P < (M \times N)/(M + N),$$

wherein a third connection number of neuron connections between the insertion layer and the replacement layer and between the insertion layer and the second layer is less than the second connection number of neuron connections between the replacement layer and the second layer.

5. A system, comprising:

one or more processors configured to perform operations or cause the system to perform operations, the operations comprising:

identify a first layer of a neural network and a second layer of the neural network adjacent to the first layer of the neural network, wherein a first connection number of neuron connections are between the first layer and the second layer;

select a first number "P" of insertion neurons for an insertion layer of the neural network, the first number "P" of insertion neurons in the insertion layer being less than a number "M" of first neurons in the first layer of the neural network and less than a number "N" of second neurons in the second layer of the neural network, wherein "P" is calculated according to the following equation:

$P < (M \times N)/(M + N)$;

modify the neural network by inserting the insertion layer between the first layer and the second layer of the neural network, wherein the first number of insertion neurons is also selected based on the first number of insertion neurons being such that a second connection number of neuron connections between the insertion layer and the first layer and between the insertion layer and the second layer is less than the first connection number of neuron connections between the first layer and the second layer;

segment the insertion layer into a first segment and a second segment;

select a first characteristic for the first segment, the first characteristic including one or more of: a fraction of inactive neurons, weight initialization methods, a fraction of fixed-weight synapses, and a fraction of inactive synapses;

select a second characteristic for the second segment, the second characteristic including one or more of: a fraction of inactive neurons, weight initialization methods, a fraction of fixed-weight synapses, and a fraction of inactive synapses obtain a first value and a second value for the first characteristic;

obtain a first value and a second value for the second characteristic;

determine a first performance of the modified neural network using the first value of the first characteristic as applied to the first segment and using the first value of the second characteristic as applied to the second segment;

determine a second performance of the modified neural network using the second value of the first characteristic as applied to the first segment and using the second value of the second characteristic as applied to the second segment; and in response to at least one of the first performance and the second performance satisfying a performance threshold, modify the modified neural network by replacing the insertion layer with an updated layer having a second number of neurons, wherein the second number is less than the first number and the performance threshold is based on performance of the neural network without the insertion layer inserted.

6. The system of claim 5, wherein the operations further comprise select the second number of neurons for the updated layer based on the second number of neurons for the updated layer increasing efficiency as compared to that of the insertion layer while maintaining a level of performance greater than the performance threshold.

7. The system of claim 5, wherein the operations further comprise select at least one of the first characteristic or the second characteristic for at least one identified segment of the insertion layer.

8. The method of claim 1, further comprising:

selecting a third number of replacement neurons for a replacement layer for the neural network, the third number of replacement neurons in the replacement layer being less than the number of first neurons in the first layer; and modifying the neural network by replacing the first layer with the replacement layer to reduce the number of connections in the neural network.

9. The system of claim 5, wherein the operations further comprise:

select a third number of replacement neurons for a replacement layer for the neural network, the third number of replacement neurons in the replacement layer being less than the number of first neurons in the first layer; and modify the neural network by replacing the first layer with the replacement layer to reduce the number of connections in the neural network.

* * * * *